United States Patent
Goth

(10) Patent No.: US 6,923,601 B2
(45) Date of Patent: Aug. 2, 2005

(54) CONVEYOR DEVICE FOR PARTICULATE MATERIAL

(75) Inventor: Gerhard Goth, Benningen (DE)

(73) Assignee: Mann & Hummel Protec GmbH, Ludwigsburg (DE)

( * ) Notice: Subject to any disclaimer, the term of this patent is extended or adjusted under 35 U.S.C. 154(b) by 0 days.

(21) Appl. No.: 10/647,118

(22) Filed: Aug. 25, 2003

(65) Prior Publication Data

US 2004/0115013 A1 Jun. 17, 2004

(30) Foreign Application Priority Data

Aug. 24, 2002 (DE) .......................... 102 38 946

(51) Int. Cl.$^7$ ............................................ B65G 53/42
(52) U.S. Cl. ................................................... 406/152
(58) Field of Search .......................... 406/14, 15, 123, 406/141, 151, 152, 153

(56) References Cited

U.S. PATENT DOCUMENTS

| | | | | |
|---|---|---|---|---|
| 530,829 A | * | 12/1894 | Duckham | .................. 406/152 |
| 2,791,470 A | * | 5/1957 | Jolley | .................... 406/152 |
| 3,884,528 A | * | 5/1975 | Shaddock | .................. 406/115 |
| 4,019,641 A | * | 4/1977 | Merz | ..................... 406/116 |
| 4,659,262 A | * | 4/1987 | van Aalst | .................. 406/29 |
| 4,718,796 A | * | 1/1988 | Shiers et al. | ................ 406/34 |
| 5,037,246 A | * | 8/1991 | Okano et al. | .............. 406/152 |
| 5,182,871 A | | 2/1993 | Karls | |
| 5,341,856 A | * | 8/1994 | Appenzeller | ................ 141/67 |
| 5,374,141 A | * | 12/1994 | Sun | ....................... 406/92 |
| 5,865,568 A | * | 2/1999 | Relin et al. | ................. 406/85 |
| 6,036,407 A | * | 3/2000 | Nester | .................... 406/109 |
| 6,588,988 B2 | * | 7/2003 | Zlotos | ..................... 406/14 |

* cited by examiner

Primary Examiner—Joe Dillon, Jr.
(74) Attorney, Agent, or Firm—Crowell & Moring LLP

(57) ABSTRACT

A conveyor apparatus for a particulate material to be conveyed, e.g., a synthetic resin granulate or powder, with a plurality of handling devices (30, 31) for processing the conveyed material, a storage bin (20) for the material to be conveyed, a conveying line (2) provided with a suction probe (1) for withdrawing the material to be conveyed from the storage bin, and a negative pressure source (4) connected to the handling devices via a suction line (7). The handling devices (30, 31) are all connected to a common conveying line (2), and a control member (8) is provided on the suction probe (1) to control the air volume going through the conveying line (2). This control member is controlled by an air pressure sensor (5) disposed on the suction line (7).

7 Claims, 1 Drawing Sheet

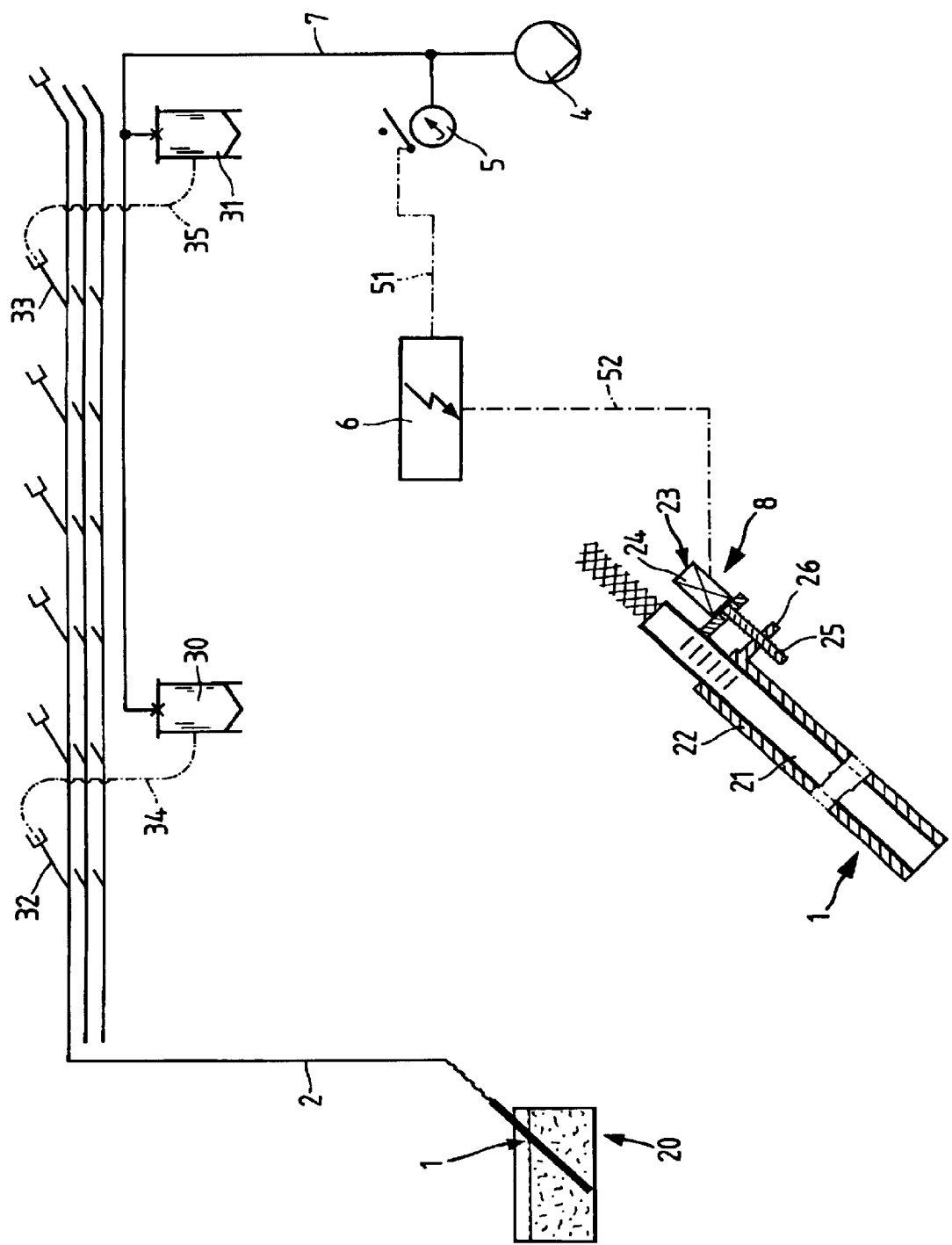

CONVEYOR DEVICE FOR PARTICULATE MATERIAL

BACKGROUND OF THE INVENTION

The present invention relates to a conveyor apparatus for a pourable material to be conveyed, for example a synthetic resin (i.e., plastic) granulate or powder, with a plurality of handling devices for processing the material to be conveyed, a storage bin for the material to be conveyed as well as a conveying line provided with a suction probe or wand for sucking in the material to be conveyed and a low pressure source connected to the conveying devices via a suction line.

To produce synthetic resin articles that are made, for example, of thermoplastic polyester, such as polyethylene terephthalate (PETP), using an injection molding machine, a dry synthetic resin granulate is fed to this machine. Because the synthetic resin granulate often contains moisture when delivered, this moisture must be removed from the granulate before it is supplied to the processing machine. To remove the moisture, substantially cylindrical dryers are used into which the moist granulate is filled. A hot, dry airstream passed through the granulate in the dryer removes the moisture from the granulate. After a sufficient residence time of the granulate in the hot, dry airstream, the dry granulate can be removed from the dryer and supplied to the processing machine. Such a system is disclosed, for example, in Karls, U.S. Pat. No. 5,182,871 (=EP 487,829).

In relatively large production plants with a plurality of processing machines, these machines are supplied with dry granulate by a plurality of dryers which are charged with moist granulate as needed from a central storage bin. Used for this purpose are conveying lines to which the individual dryers, also referred to as conveying devices, are connected. Each conveying line is provided with a suction probe, which dips into the storage bin to remove granulate. The granulate is sucked out of the storage bin by means of negative pressure. For this purpose each of the conveying devices is connected to the suction end of a pump via a common suction line.

In the described plants, the individual dryers are often spaced far apart from one another, e.g., at a distance of 100 meters. If each dryer is connected to its own conveying line, the diameters of the conveying line and the suction line are determined not only in view of minimizing granule abrasion, dust development and pipeline wear but also as a function of the location of the respective dryer relative to the storage bin. The development of dryer-specific conveying lines and suction lines, however, is costly and time consuming.

SUMMARY OF THE INVENTION

Thus, it is an object of the invention to provide an improved conveying device for particulate material.

Another object of the invention is to provide a conveying device for particulate material in which the complexity of conveying lines and vacuum lines is decreased.

A further object of the invention is to provide a conveying device for particulate material in which the design and installation costs of conveying lines and suction lines is reduced.

These and other objects are achieved in accordance with the present invention by providing a conveyor apparatus for a particulate material to be conveyed, said apparatus comprising a plurality of handling devices for processing the material to be conveyed, a storage vessel for the material to be conveyed, a conveying line provided with a suction probe for withdrawing the material to be conveyed from the storage vessel, and a negative pressure source connected to the handling devices via a suction line, wherein the conveying line is a common conveying line to which all the handling devices are connected, and a control member is provided on the suction probe for regulating the air flow rate through the conveying line in response to a signal from an air pressure sensor disposed on the suction line.

For this purpose, the handling devices in the conveyor apparatus according to the invention are connected to a conveying line common to all the handling devices, and an air pressure sensor provided on the suction line controls a control member that is disposed on the suction probe to control the air flow rate through the conveying line. This eliminates the need for conveying lines and suction lines designed specifically for each handling device. It nevertheless assures that a substantially constant suction pressure for transporting granulate into a handling device is always present in the conveying line. This is true irrespective of the length of the effective conveying line between the suction probe and the respective handling device.

The invention is not limited to the transport of moist synthetic resin granulate but can be used wherever a pourable particulate material, including a powdered material, is to be supplied as needed from a storage vessel to a plurality of consumers.

Preferably, each handling device on the conveying line has its own connecting nipple and a connecting line leading from the connecting nipple to the handling device. This makes it possible to install the conveying line largely in a straight line.

In accordance with a further refinement of the invention, a signal output line of the air pressure sensor is connected to a controller, which compares a signal from the signal output line to a predetermined target value and produces a resulting control signal, which is supplied in turn to the control member.

According to one advantageous embodiment of the invention, the suction probe comprises an inner tube, which is open at one axial end face and is connected with the conveying line, and a control component, which is coupled with the control member and partially covers the end face opening of the inner tube. This control component can simply be an outer tube which surrounds the inner tube and is capable of being axially displaced relative to the inner tube. The control member is preferably the drive element of a preferably electric servomotor whose housing is mounted either to the control component or to the inner tube.

BRIEF DESCRIPTION OF THE DRAWING

The invention will be described in further detail hereinafter with reference to a illustrative preferred embodiment shown in the accompanying drawing FIGURE which is a schematic representation of conveying device for a pourable, particulate material according to the invention.

DETAILED DESCRIPTION OF PREFERRED EMBODIMENTS

One end of a material-specific conveying line 2 terminates in a suction probe, which as a whole is identified by the numeral 1 and which in the operation of the illustrated conveyor apparatus is extended into a moisture-laden synthetic resin granulate. The synthetic resin granulate is located in a storage bin or vessel 20, which is replenished with synthetic resin granulate to maintain a sufficient level.

A plurality of spaced apart connecting nipples, the number of which is not subject to any limitation, is attached along the length of the conveying line 2. The figure shows two of these, identified as connecting nipples 32 and 33. A connecting line 34 leads from the connecting nipple 32 to the inlet of a handling device 30, which can be a dryer such as the one described in the cited prior art. A connecting line 35 leading to the inlet of a handling device 31 is connected to the connecting nipple 33, which is spaced at a substantial distance from connecting nipple 32 along the conveying line 2. Shut-off valves (not shown) are mounted on the connecting nipples 32, 33. These shut-off valves are open only if the respectively connected handling device 30 and/or 31 is to be charged with moist granulate from the storage bin 20.

The handling devices 30 and 31 are connected to a common suction line 7, which leads to the suction port of an air pump 4 used as a negative pressure source. When the air pump 4 is switched on, it sucks air out of the suction line 7 and the handling devices 30 and 31 for which the associated shutoff valve is open, and further sucks air out of the section of the conveying line 2 located between the respective connecting nipple 32 and/or 33 and the suction probe 1. As a result, the moist granulate is entrained out of the storage bin 20 by the airstream and is supplied to the respective handling device 30 and/or 31 through the corresponding connecting nipple 32 and/or 33 and the connecting line 34 and/or 35.

The suction probe 1 comprises an inner tube 21 having an open axial end face through which granules can be sucked unhindered from the storage bin 20 into the interior of the inside tube 21. The front section of the inner tube 21 is surrounded by an outer tube 22, which can be axially displaced along the inner tube 21 and which is drivingly coupled with the drive shaft 25 of an electric servomotor 23 via a radially outwardly projecting bar 26. The housing 24 of the servomotor 23 is firmly mounted to the part of the inside tube 21 that protrudes rearward from the rear end of the outside tube 22. When the servomotor 23 is actuated, the drive shaft 25 is thus rotated in one or the other direction of rotation, so that the outer tube 22 is longitudinally displaced along the inner tube toward either the front or the rear in relation to the inner tube 21. As a result the outer tube 22 more or less covers the open end face of the inner tube 21 and thereby enlarges or reduces the effective suction area for the granules. The servomotor 23 and the driven shaft 25 act as a control member, which as a whole is identified by the numeral 8.

An electric controller 6 is connected on the input side to a signal output line 51 from an air pressure sensor 5 that detects the air pressure in the suction line 7. On the output side, the controller 6 is connected to a signal line 52 that leads to an actuation input of the servomotor 23. A predefined target value that represents the desired air pressure inside the suction line is stored in a memory location of the controller 6. A comparator in the controller 6 compares the signal detected at the signal output line 51, which represents the actual value of the air pressure currently present in the suction line, with the target value and produces a control signal which it supplies to the servomotor 23 via the signal line 52. The target value depends on the type of the material to be conveyed and the conveying lines used as well as other specific structural characteristics of the respective application of the invention. The corresponding suitable target value can be entered into the memory location of the controller and can be varied, for example, for a different material to be conveyed.

This makes it possible to obtain a substantially optimal suction pressure in the suction line 7 and the corresponding section of the conveying line 2 irrespective of the length of the section or the distance of the respective handling device (s) from the storage bin 20. As a result, handling devices whose conveying lines differ in length will receive the same required suction pressure so that the same granulate flow rate is achieved.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A conveyor apparatus for a particulate material to be conveyed, said apparatus comprising a plurality of handling devices for processing the material to be conveyed, a storage vessel for the material to be conveyed, a conveying line provided with a suction probe for withdrawing the material to be conveyed from the storage vessel, and a negative pressure source connected to the handling devices via a suction line, wherein the conveying line is a common conveying line to which all the handling devices are connected, and a control member is provided on the suction probe for regulating the air flow rate through the conveying line in response to a signal from an air pressure sensor disposed on the suction line, and wherein each handling device is provided with an individual connecting nipple on the conveying line and a connecting line leading from the connecting nipple to the handling device.

2. A conveyor apparatus according to claim 1, wherein said particulate material to be conveyed is a synthetic resin granulate or powder.

3. An apparatus according to claim 1, wherein a signal output line from the air pressure sensor is connected to a controller that compares a signal from the pressure sensor representing the pressure in the suction line to a predefined target value and produces a control signal for regulating the position of the control member.

4. An apparatus according to claim 1, wherein the suction probe comprises an inner tube and a moveable control component, said inner tube having an opening at one axial end thereof and being connected to the conveying line, and said control component being coupled with the control member so as to be moveable by the control member to partially cover or uncover the opening at the end of the inner tube.

5. An apparatus according to claim 4, wherein the control component comprises an outer tube which surrounds the inner tube and is axially displaceable relative to the inner tube.

6. A conveyor apparatus for a particulate material to be conveyed, said apparatus comprising a plurality of handling devices for processing the material to be conveyed, a storage vessel for the material to be conveyed, a conveying line provided with a suction probe for withdrawing the material to be conveyed from the storage vessel, and a negative pressure source connected to the handling devices via a suction line, wherein the conveying line is a common conveying line to which all the handling devices are connected, and a control member is provided on the suction probe for regulating the air flow rate through the conveying line in response to a signal from an air pressure sensor disposed on the suction line, and wherein the control member is a driving element of a servomotor having housing mounted to the control component or to the inner tube.

7. An apparatus according to claim 6, wherein a signal output line from the air pressure sensor is connected to a controller that compares a signal from the pressure sensor representing the pressure in the suction line to a predefined target value and produces a control signal for regulating the position of the control member.

* * * * *